June 16, 1964

R. J. PRESTON 3,137,793

METHOD AND APPARATUS FOR DETERMINING CONTAMINATION OF
A METAL BODY BY URANIUM

Filed July 17, 1959

INVENTOR
Richard J. Preston

BY *Eldon H. Luther*

ATTORNEY

INVENTOR
Richard J. Preston
BY Eldon H. Luther
ATTORNEY

INVENTOR
Richard J. Preston
BY
Elda H. Luther
ATTORNEY

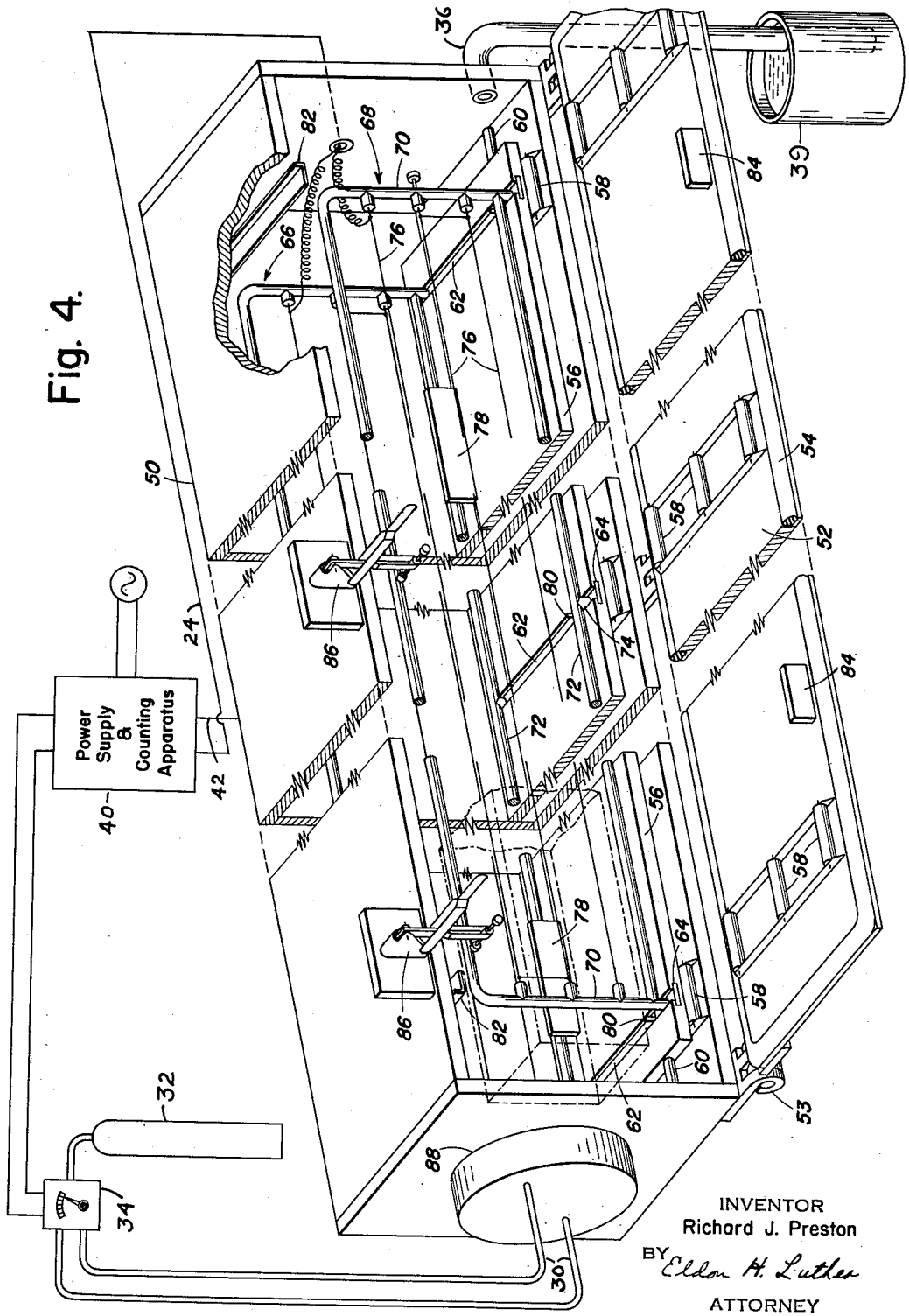

Fuel Element Alpha
Contamination Counting System
Chamber Plateau Check
National Bureau of Standards
667 Counts per Minute Source
± 5%  5/8" Anode to Fuel Plate
Surface Spacing Instrument Block Diagram
for Fuel Element Alpha
Contamination Counting System INVENTOR
Richard J. Preston BY *Elden H. Luther*

ATTORNEY

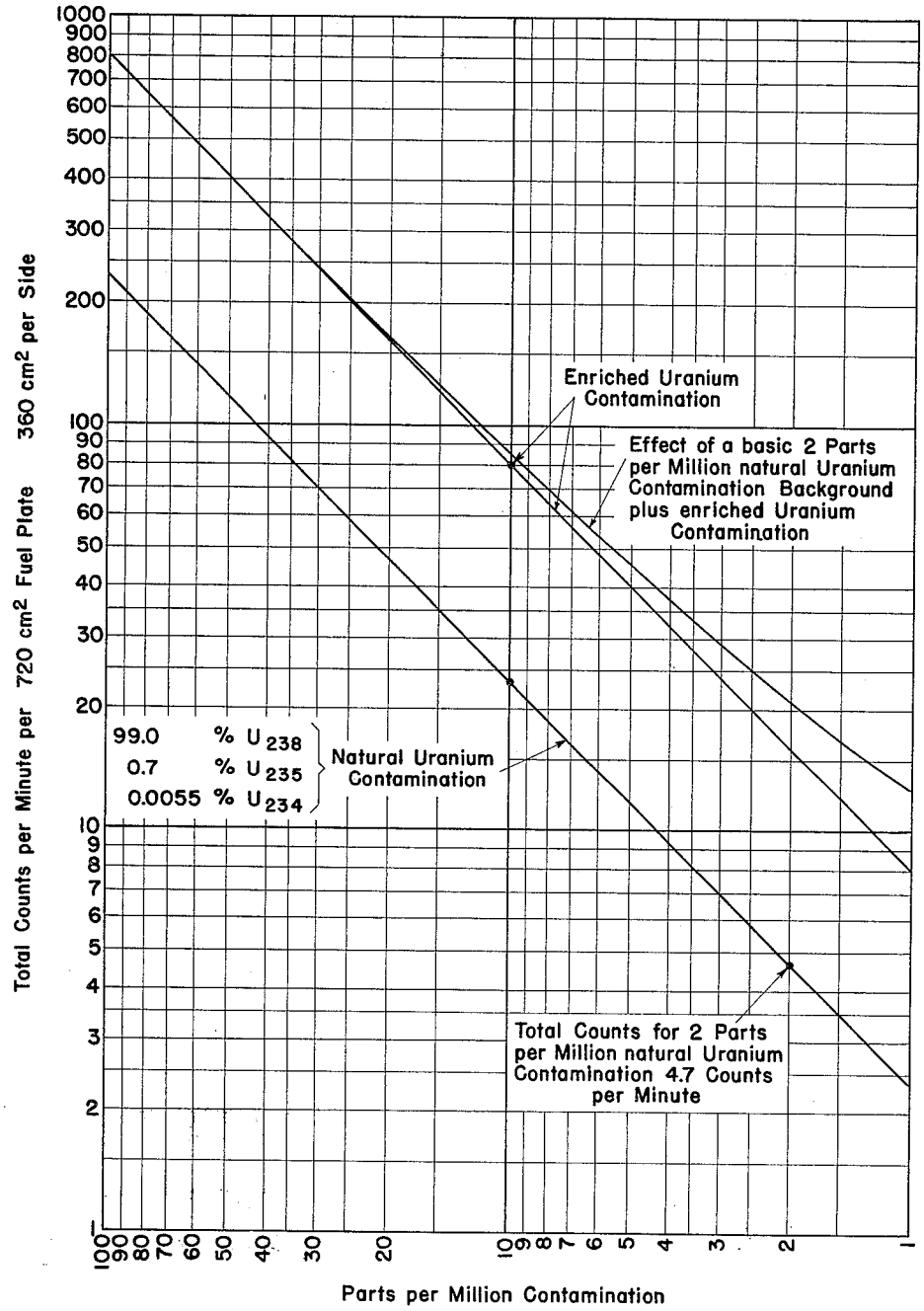
Fig. 7. Fuel Element Alpha Contamination Counting System Relationship between Count Rate and Quantity of Alpha Contamination (Calculated Values)

United States Patent Office 3,137,793
Patented June 16, 1964

3,137,793
METHOD AND APPARATUS FOR DETERMINING CONTAMINATION OF A METAL BODY BY URANIUM
Richard J. Preston, Mansfield Center, Conn., assignor to Combustion Engineering, Inc., New York, N.Y., a corporation of Delaware
Filed July 17, 1959, Ser. No. 827,740
4 Claims. (Cl. 250—83.6)

This invention relates to a method of an apparatus for determining the amount of uranium contamination within fission fragment range from the surface for a metallic member and is more particularly concerned with determining the amount of such uranium contamination in the cladding of the fuel elements control rods, and the like, for nuclear reactors.

It is of importance to know the amount of uranium contamination of a fuel element or control rod both in the surface thereof and below this surface for the distance that fission fragments will travel within the cladding of the element or the material of the rod and accordingly may escape from the cladding or rod. This contamination with respect to the cladding of fuel elements may originate from two sources. The first is the natural uranium contamination of the clad material, for example, Zircaloy-2; and the second is the enriched uranium impurities absorbed by the cladding material during fuel element fabrication. With respect to control rods the contamination results from the natural uranium contamination of the material and from contamination picked up by manufacture and handling. It is important to know the extent of this contamination, since during operation of the reactor the uranium atoms in the cladding and the rod will fission and the fragment recoils which are ejected into the coolant and contaminate the primary system. Accordingly, any surface and/or sub-surface contamination within the fission fragment range in the cladding or the rod either homogeneously or heterogeneously distributed, will be a source of primary coolant contamination. Sub-surface deposits of uranium impurities in the cladding and the rod are particularly important from the standpoint of coolant contamination because of the relatively small ratio of surface to sub-surface uranium, the sub-surface material thereby being the major source of primary coolant contamination. It is therefore necessary to maintain this cladding and rod contamination by uranium below a predetermined value in a particular reactor system in order that the primary system of the reactor will not become highly contaminated with radioactive fission products. This necessitates being able to relatively accurately determine the amount of this contamination in the fuel element and rod prior to utilizing them in a reactor. One way of measuring this contamination is by alpha particle counting. Uranium spontaneously emits alpha particles of a predetermined energy and the range of these particles in a cladding material for a fuel element or a material of a rod will be somewhat greater than the fission fragment range. Accordingly, by counting the alpha particle emission of a clad fuel element or a control rod the amount of contamination by uranium in the cladding material or rod, as for example, in parts per million, may be determined.

The present invention is directed to a method and apparatus for alpha particle counting utilizing the gas flow proportional counting technique with the invention counting the complete alpha particle emission from the cladding of the element or from the rod at one time, or, in other words, the invention obtains double two pi counting.

In accordance with the invention the fuel element or rod is placed in an elongated chamber which is then closed. This chamber has an electrically conductive inner wall surface, and, as is well known, the fuel element or rod is in the form of a flat thin elongated plate which may vary in length with a typical length being 42 inches. Each of the walls of the chamber that are opposite the flat surface of the fuel element or rod has a metallic wire of small diameter spaced therefrom and electrically insulated therefrom with this wire extending generally throughout the length of the flat surface of the fuel element or rod. A high voltage power supply is connected so that these wires act as an anode and are at a relatively high positive potential with respect to the fuel element or rod and the inner surface of the chamber both of which act as a cathode. Radioactive-free gas is admitted to the chamber and continuously flows through the chamber during the counting process with the gas being maintained at a given relatively low pressure in the chamber An electric counting circuit or nuclear scaler is connected to the anode and cathode to register the counts that are produced by alpha particle emission into the gas in the chamber and a timing system for purging the chamber with gas and then automatically establishing a present time count forms part of the electrical control system of the invention.

With this method and apparatus it has been found possible to accurately and reliably detect contamination levels in the fuel element cladding or control rods in the range as low as 1 and as high as 1000 parts per million natural uranium equivalent.

Accordingly it is an object of this invention to provide an improved technique and apparatus for determining uranium contamination in a sizable metallic member.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 4 is a perspective view of a modified arrangement adapted for production operation and capable of receiving different sized structure for counting;

FIG. 7 is a curve prepared for a particular area and make up of fuel element and shows how the contamination may be readily obtained from the count rate.

In the following detailed description reference will be made only to the use of fuel elements and determining the alpha count thereof. However, this is solely for the purpose of explanation with it being understood, as mentioned hereinbefore, that the invention is applicable to other structural elements.

Figure 2:
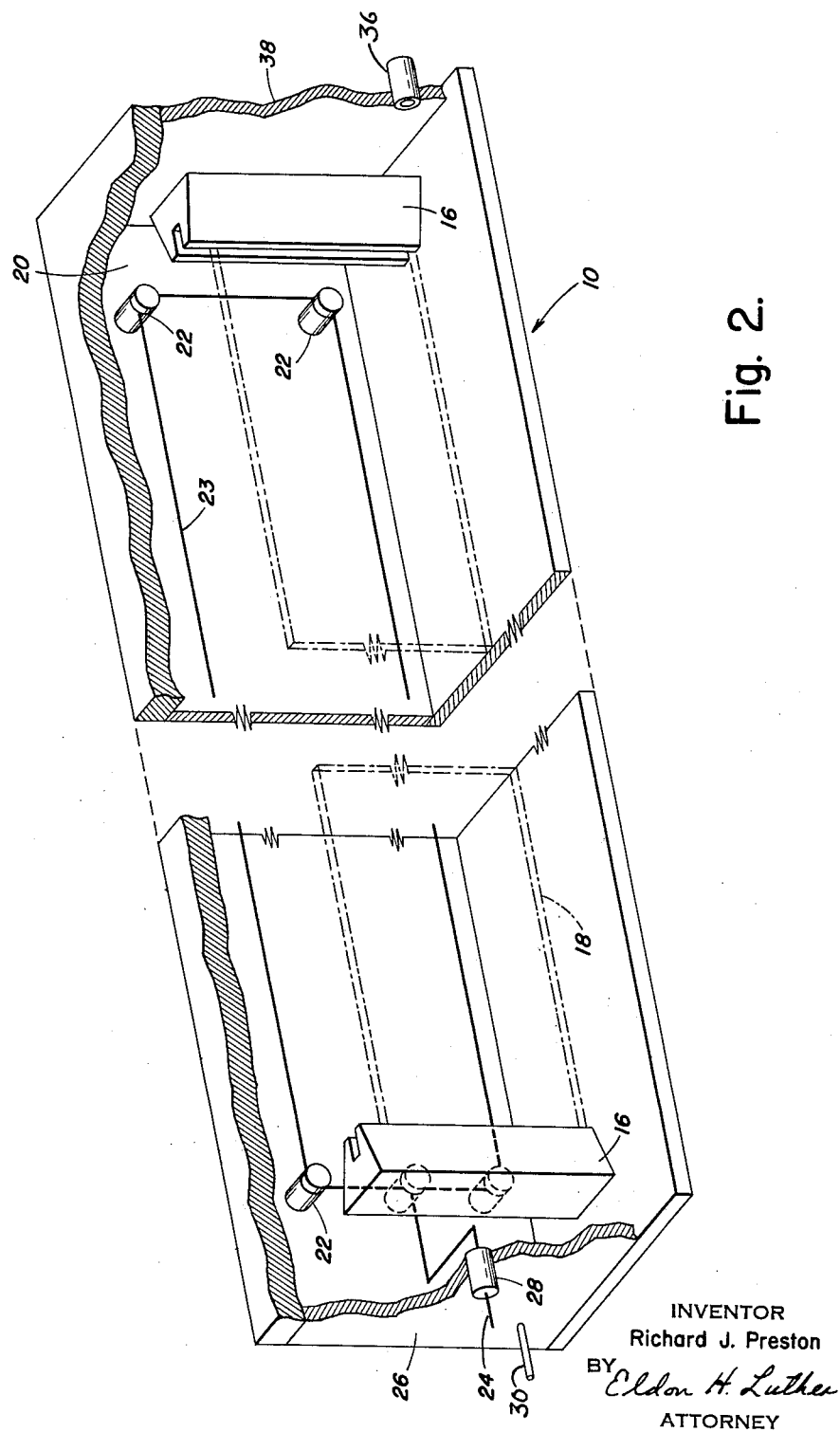
FIG. 2 is a fragmentary perspective view of the housing within which the fuel element is positioned with this view showing the internal construction of the housing.
Figure 3:
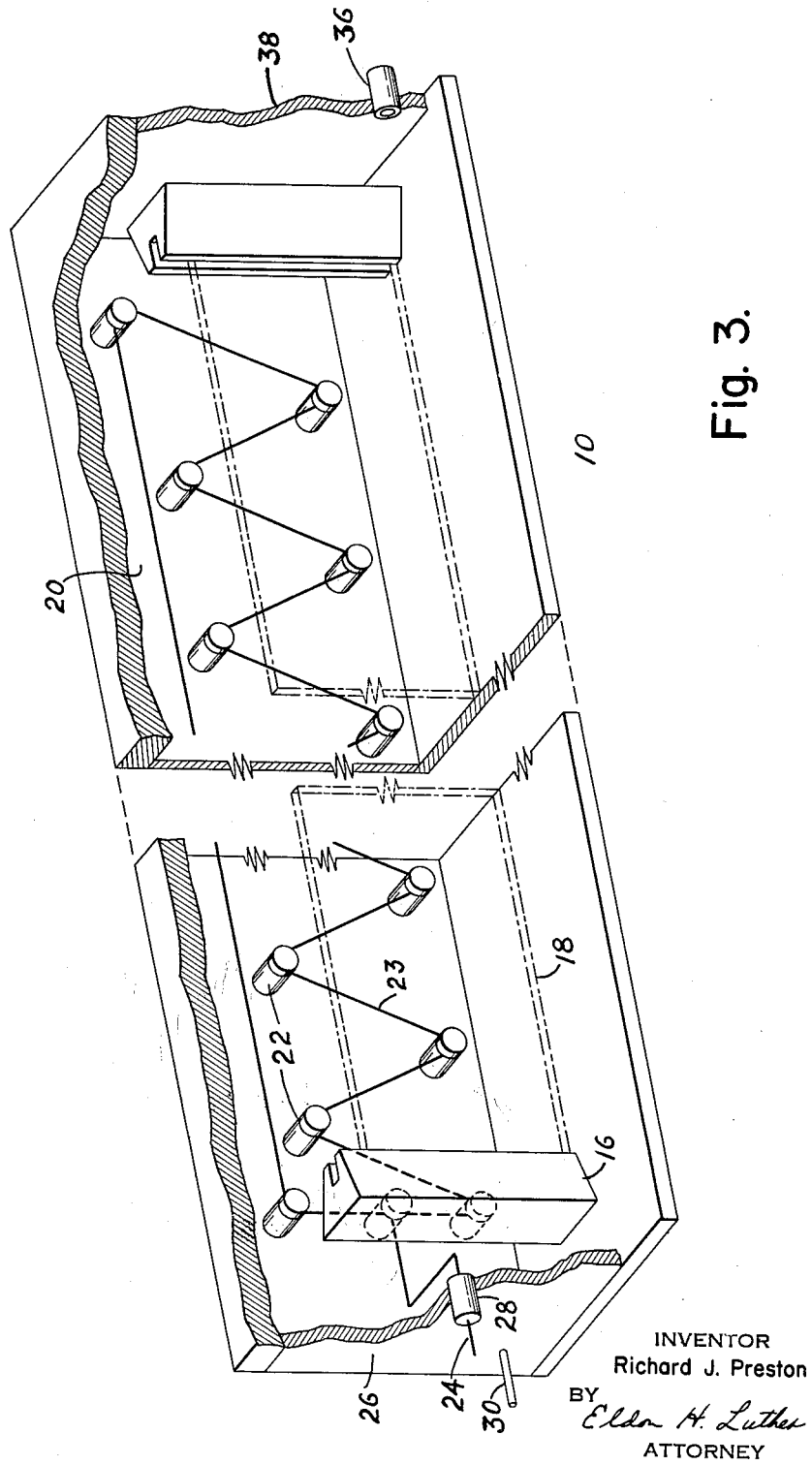
FIG. 3 shows a modified configuration of anode wire.

Referring now to the drawings, wherein like reference numerals are used throughout to designate like elements, the illustrative and preferred embodiment of the invention depicted therein includes the housing or container 10 which is provided in its top with a removable cover 12, this cover seating within the opening 13 provided in the top of the housing in a generally fluid tight manner, with an O-ring seal 14 being provided for this purpose. In the illustrative form shown, housing 10 is constructed of mild steel and forms a chamber of sufficient length so that a fuel element, which as previously mentioned, may be 42 inches long, can be received therewithin. In the housing there is provided a pair of upright guides 16 (FIG. 2) which are suitably slotted for receipt of a fuel element with the fuel element being here illustrated in dotted lines and identified as 18. Each of the side walls 20 of the housing has electrically insulated lugs 22 extending therefrom (FIGS. 2 and 3) with an electrically conductive wire 23 being strung between or supported from the end by these lugs. These wires are connected to a conductor 24 which passes through the wall 26 of the housing with this conductor being insulated from this end wall by means of the insulating bushing 28. The wire that extends along the inner surface of side walls 20 of the chamber may be of various configurations, as for example, it may be in the form of a loop as shown in FIG. 2 or it may take a serpentine configuration as shown in FIG. 3 it being essential that the wire lie in a plane parallel with the face or surface of the plate and extend throughout the length of the plate. It is necessary that this wire be of as small a diameter as practical with relation to physical strength and a tungsten platinum or strainless steel wire of .003 to .005 inch diameter has been found quite satisfactory. It is desired that the length of the wire be maintained at a minimum in order that the capacitance to the counting circuits may be as low as possible.

Also extending through the end wall 26 are gas inlet tubes 30 which are connected to a suitable source of radioactive-free gas 32 with a suitable timing control device 34 being disposed or positioned in the connection of this gas source with the tubes 30. Gas that is admitted into the interior of housing 10 passes through the housing and leaves through the opposite end wall 38 through conduit 36 that depends into oil bubbler 39 which is effective to maintain a back pressure in the housing of a desired value as for example 3".

Figure 1:
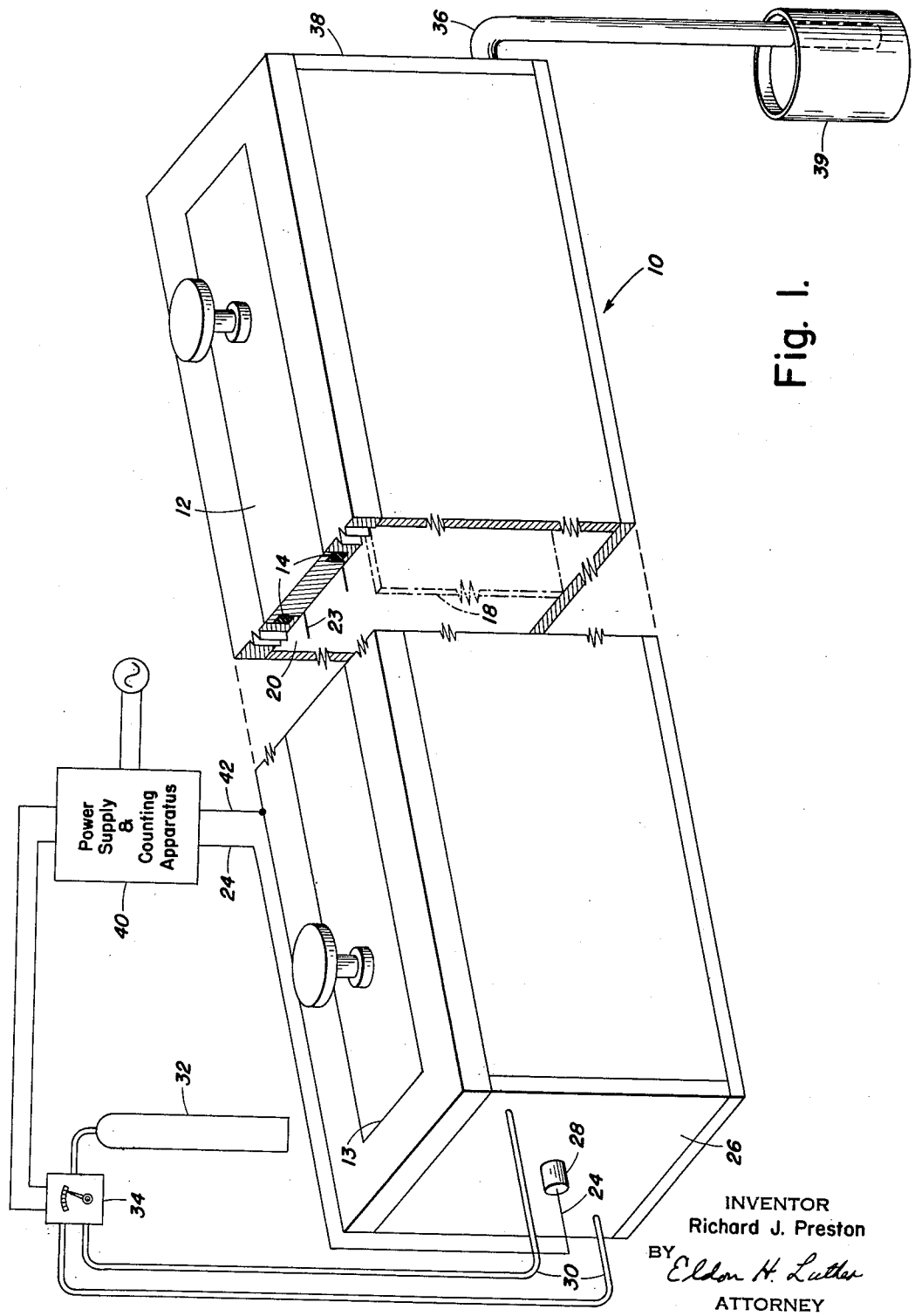
FIG. 1 is a somewhat diagrammatic representation of an apparatus for carrying out the invention.
Figure 5:
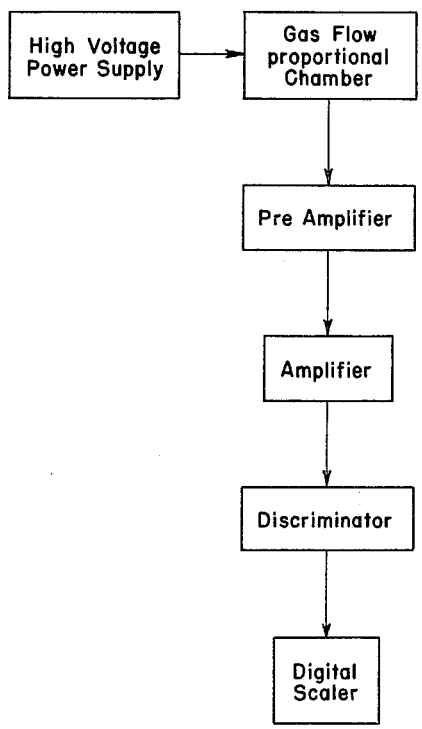
FIG. 5 is a block diagram of the instrumentation of the counting organization of the invention.

In the illustrative organization of FIG. 1, 40 identifies a high voltage power supply and an electric counting circuit including a nuclear scaler, the function of which will be described hereinafter. High voltage is supplied from the source 40 to anode wires 23 which are connected to the source through conductor 24 with the source also being connected to housing 10 through conductor 42. This high voltage source is connected to these elements in a manner so that the wires 23 located on each side of fuel element 18 become an anode and are provided with a high positive potential while the housing and the fuel element 18 become the cathode with the potential of course being developed between the anode and cathode. The electric counting circuit of the apparatus identified as 40 is connected so as to count the pulses that are produced by alpha particle projection from the fuel element cladding into the gas in the housing. Since power supplies as well as electronic counting circuits or nuclear scalers are well known and available, the details of these apparatus are not shown or described but are rather only diagrammatically represented herein. FIG. 5 is a block diagram of the circuitry for counting the current pulses developed as a result of the ionizing effect of the alpha particles projected from the fuel element into the gas in housing 10. The current pulse is changed to voltage pulse, is suitably amplified, passed through a discriminator, and then to a digital scaler which counts the pulses. It will be understood that the circuitry and the timing control organization of FIG. 1 is employed with each embodiment of the invention.

The timer 34 is effective to provide a gas purge of the chamber formed by housing 10 and then automatically activate the electric counting circuit for a pre-set time count while at the same time maintaining a relatively slow flow of gas through the chamber.

In the operation of the system of the invention, a fuel element is first inserted into the chamber in guides 16 and cover 12 is closed. The electric timer 34 is activated and the power supply energized so that a substantial potential is developed between wire 23 and the fuel plate and between wire 23 and the housing with the chamber being purged with a radioactive-free gas. After a sufficient purging time the timer 34 is effective to activate the electric counting circuit for a pre-set time count. By means of this count the amount of uranium contamination of the cladding of the fuel element can be accurately determined.

Figure 6:
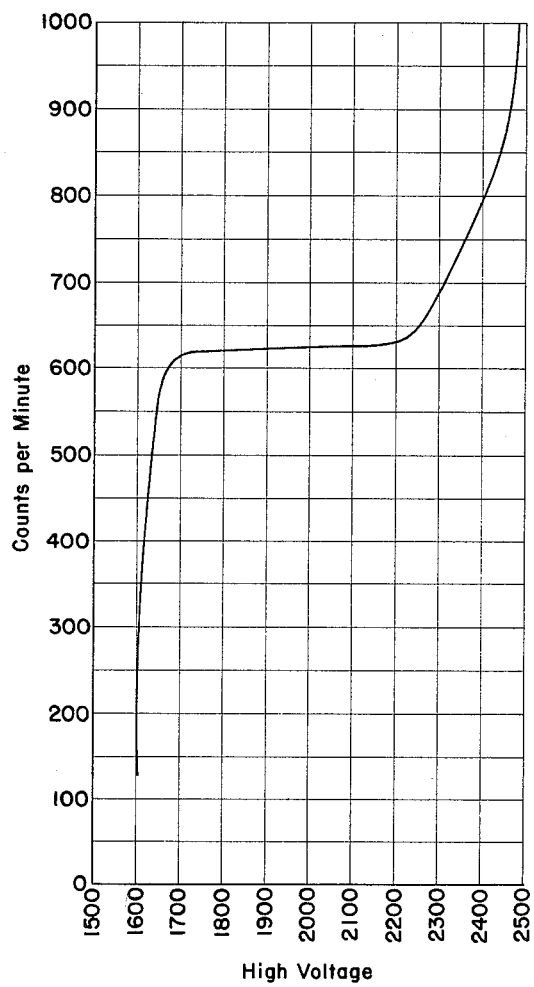
FIG. 6 is a voltage vs. count rate curve obtained with the organization of FIGS. 1 and 2 utilizing a known source and with the anode wires being 5⁄8" from the surface of the source.

The theory of operation of gas flow proportional counting is well known and need not here be discussed with it only being necessary to mention that the potential between the cathode and anode of applicant's organization must be sufficient so that a count for each alpha particle emanating from the fuel element will be registered with it being essential that this potential be at the plateau of the count rate-voltage curve. Such a curve is shown in FIG. 6 with the high voltage or potential between the cathode and anode being the abscissa while the count rate expressed in counts per minute is the ordinate. This curve was obtained with the organization of the invention employing a sample obtained from the National Bureau of Standards which produced 667 counts per minute within an accuracy of plus or minus of 5% and with the sample being ⅝ of an inch from the anode wire. Such an example can be relatively easily prepared through chemical processes and acts as an excellent check for an alpha counting organization. It will be noted that at the plateau of the curve, i.e., between the potentials of 1800–2150 volts the accuracy of the counter varies only slightly and is in good agreement with the known source while above and below the plateau the counter is very inaccurate. The plateau of the curve is also dependent upon the distance of the anode from the source and this distance must be relatively accurately maintained. As a result of this curve it is evident taht even with the mild steel housing that was employed in this apparatus the background radiation was sufficiently low so as to have no substantial effect upon the accuracy of the apparatus.

Since the invention is for the purpose of determining the combination in the cladding of fuel elements or other structural elements it is of course necessary to convert the count rate obtained with the organization of the invention into a reading or indication of contamination. FIG. 7 readily illustrates the ease with which this is accomplished. The information depicted or represented by this figure is determined by calculations with the abscissa of this curve or graph representing contamination in parts per million while the ordinate represents total counts per minute received or obtained with the organization of the invention using a particular fuel element which has an area of 720 sq. centimeter total surface (both sides) with the element having a natural contamination of 2 parts per million natural uranium and with the remainder of the contamination being enriched uranium. As previously mentioned these curves are obtained by calculations and to find the contamination of this particular element the uppermost curve is employed so that if the count rate is 20 counts per minute the contamination is about 1.9 parts per million. As identified in FIG. 7 the lower curve is obtained from natural uranium contamination, the intermediate curve from enriched uranium and the uppermost curve represents enriched uranium plus the two parts per million natural uranium background contamination of the particular material.

The embodiment of FIG. 4 represents a more complex organization, structurally speaking, than that of FIGS. 1 and 2 with this modified arrangement being particularly well adapted for production operation where elements of different size may be employed and where it is desired to effect the count as rapidly as possible. As embodied this organization includes housing 50 which has a pivoted front wall 52 that may be pivotally moved from the horizontal position shown and in which it is maintained by hinges 53 to a vertical position where it engages in sealing relation with the edges of the top, bottom and sides of the housing with this front wall being provided with a sealed gasket 54 in order to insure its sealing relation with these edges. Within housing 50 is positioned base plate or rack 56 with this plate being supported in the housing on rollers 58 and being rollable out of the front opening of the housing onto front wall 52 when this wall is in its hrizontal position and with the similar rollers 58 being provided on this wall for receipt of the plate and easy manipulaiton thereof. In order to effect this movement of the plate 56 handles 60 are provided at each end of the plate.

The upper surface of plate 56 is provided with three longitudinally spaced T-slots 62 which extend transversely of the plate as shown. Slidably received within these slots is the base member 64 of the anode support frames 66 and 68. Each of these frames includes upright members 70 which are connected to and extend up from the base member 64 at each end of the plate 56 and between which upright members extends the longitudinal members 72 each of which is connected with a center base member 64 by stud 74. Also extending between the upright members 70 is the anode wire 76 with this wire extending back and forth three times in the illustrative organization and is supported from suitable electric insulators which are connected to the members 70. The innermost support frame 66 is in predetermined relation with respect to the inner edge of plate 56 and spacing stops such as shown at 78 are provided on plate 56 so that an elongated member may be slid onto the surface of plate 56 into engagement with these stops and thereby be precisely located with regard to the anode wire 76 of frame 66. The location of the anode wire of frame 68 is also precisely located by suitable stops with these stops taking the form of upstanding lugs or strip 80 at the forward end at each of the base members 64 to which frame 68 is secured.

It will be appreciated that in order to slide an element, such as a fuel element or cluster, that is to be counted, or in other words is to have its contamination determined onto plate 56 it will be necessary to remove the anode support frame 68 from the position that it occupies in the illustrative showing. For this purpose storage brackets 82 are secured to the roof of the housing 50 at each end thereof and frame 68 may be slid out from T-slots 62 rotated into a horizontal position and slid onto the bracket 82 so that a suitable element may be readily positioned on the base 56. After thus positioning this element, support frame 68 may be repositioned with base member 64 received within the T-slots and with the support frame being moved forward until the stops 80 engage the element whereby the support frame 68 will be accurately positioned with relation to the element. Outward movement of base plate 56 onto the front wall 52 is limited by stop members 84.

The front wall 52 is of course retained in its vertically sealed position during operation of the device and in order to thus retain this pivotal wall suitable clamp devices designated 86 are provided along the length of the housing.

In order that the admission of gas, such as argon or other radioactive-free gas to the interior of housing 50 may be regulated, valve 88 is provided at the gas entrance of the housing and the supplying of gas to the housing as well as the timing organization, power supply and counting circuitry for the embodiment of FIG. 4 is the same as that for FIGS. 1 and 2 with the operation also being the same.

While I have illustrated and described a preferred embodiment of my novel organization, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. An alpha counting organization comprising an elongated housing forming a chamber having a metallic inner surface, said housing having a door for admitting an elongated member into the chamber to count the alpha emission thereof, a pair of electrical conducting means in and electronically insulated from the housing in parallel spaced relation and extending generally throughout the length of the housing, means for supporting an elongated member, the alpha emission of which is to be counted, intermediate said pair of conductor means and in predetermined spaced relation therewith, a high voltage direct current source, said source being connected to make the conductor means an anode and the inner surface of the housing and a member supported in the housing a cathode, means operative to pass a radioactive-free gas through the housing and maintain the gas in the housing under a predetermined pressure, electric counting means connected with the conductor means and operative to count the pulses produced by alpha particles projected into the gas in the chamber, and a timing device effective to cause a predetermined gas purge of the chamber and after said purge activate the counting means for a predetermined time count.

2. The organization of claim 1 wherein the housing is provided with a pivotal front wall that forms said door and is pivoted to and from a closed position and an open horizontal position, and wherein the support for the elongated member comprises a support base that is mounted for lateral movement from the housing onto the front wall when the latter occupies its horizontal, open position.

3. The organization of claim 1, wherein a support frame is provided at each side of the support base for supporting the electrical conducting means.

4. The organization of claim 1 wherein one of the support frames is stationarily mounted with respect to the support base and the other is laterally movable relative thereto and stop means are provided to accurately position a member, the alpha emission of which is to be counted with relation to the conductor means supported by each of said frames.

References Cited in the file of this patent

UNITED STATES PATENTS

| | | |
|---|---|---|
| 2,490,298 | Ghiorso et al. | Dec. 6, 1949 |
| 2,531,144 | Manley | Nov. 21, 1950 |
| 2,597,535 | Segre | May 20, 1952 |
| 2,599,166 | Dempster | June 3, 1952 |
| 2,622,208 | Bernstein et al. | Dec. 16, 1952 |
| 2,634,609 | Obermaier | Apr. 14, 1953 |
| 2,837,656 | Hendee et al. | June 3, 1958 |
| 2,917,648 | Davidon | Dec. 15, 1959 |
| 2,957,084 | Marr et al. | Oct. 18, 1960 |
| 2,976,677 | Taylor | Mar. 28, 1961 |
| 2,998,522 | Martin et al. | Aug. 29, 1961 |
| 3,085,156 | Gregory et al. | Apr. 9, 1963 |